(12) United States Patent        (10) Patent No.:     US 7,997,497 B2
     Stone                        (45) Date of Patent:     Aug. 16, 2011

(54) GAME CARD WITHOUT SEMICONDUCTOR CHIP

(75) Inventor: Kate Jessie Stone, Cambridge (GB)

(73) Assignee: Novalia Limited, Cambridge (GB)

( * ) Notice: Subject to any disclaimer, the term of this patent is extended or adjusted under 35 U.S.C. 154(b) by 777 days.

(21) Appl. No.: 11/794,972

(22) PCT Filed: Jan. 6, 2006

(86) PCT No.: PCT/GB2006/050004
§ 371 (c)(1),
(2), (4) Date: Apr. 30, 2008

(87) PCT Pub. No.: WO2006/072806
PCT Pub. Date: Jul. 13, 2006

(65) Prior Publication Data
US 2009/0206163 A1    Aug. 20, 2009

(30) Foreign Application Priority Data
Jan. 7, 2005  (GB) .................................... 0500229.0

(51) Int. Cl.
*G06K 19/06*   (2006.01)
(52) U.S. Cl. .................... 235/492; 235/380; 235/375
(58) Field of Classification Search ............ 235/492, 235/380, 375; 324/504, 501, 760
See application file for complete search history.

(56) References Cited

U.S. PATENT DOCUMENTS

| | | | |
|---|---|---|---|
| 3,678,251 | A | 7/1972 | Delpino |
| 3,876,865 | A | 4/1975 | Bliss et al. |
| 4,115,931 | A | 9/1978 | Futhey et al. |
| 5,599,046 | A | 2/1997 | Behm et al. |
| 2002/0109295 | A1 | 8/2002 | Browne et al. |
| 2003/0155714 | A1 | 8/2003 | Higashida |
| 2004/0214642 | A1 | 10/2004 | Beck |
| 2006/0293099 | A1* | 12/2006 | Cooper .......................... 463/25 |

FOREIGN PATENT DOCUMENTS

| | | |
|---|---|---|
| CA | 2 357 934 | 3/2002 |
| DE | 196 48 549 | 5/1998 |
| EP | 1 217 636 | 6/2002 |
| FR | 2 597 212 | 10/1987 |
| JP | 2003-251075 | 9/2003 |
| WO | 01/39851 | 6/2001 |

OTHER PUBLICATIONS

Patent Abstracts of Japan, Publication No. 2003-251075, "IC Card, Game Machine, Rewriting Device, and Recording Medium Storing the Program," published Sep. 9, 2003, English Abstract, 1 page.
Search Report (1 page) and cover letter (1 page) from UK Patent Office regarding Application No. GB0500299.0, two pages total, dated Sep. 1, 2005.

\* cited by examiner

*Primary Examiner* — Edwyn Labaze

(57) ABSTRACT

Trading cards (1, 2) each include part (17, 18) of a circuit. When the trading cards are inserted into a game card (3), a circuit is completed. Depending on the circuit, one of four light emitting diodes ($29_1, 29_2, 29_3, 29_4$) on the game card is lit. No semiconductor chip is required in the card.

22 Claims, 4 Drawing Sheets

GAME CARD WITHOUT SEMICONDUCTOR CHIP

CROSS-REFERENCE TO RELATED APPLICATION

This application is the U.S. National Stage of International Application Number PCT/GB2006/050004 filed Jan. 6, 2006 in English and published Jul. 13, 2006 under International Publication Number WO 2006/072806 A1 and which claims priority from Great Britain Application 0500229.0 filed Jan. 7, 2005.

FIELD OF INVENTION

The present invention relates to trading cards and cards for comparing against other similar cards in a game or pastime.

BACKGROUND ART

A trading card is one of a set of cards which relate to a given theme or subject, such as a sport, and which are usually acquired and exchanged by players or collectors, such as schoolchildren or enthusiasts, as a pastime.

Trading cards can include numerical data relating to the subject of the trading card. Thus, cards can be played against each other in a game by comparing corresponding values of a chosen characteristic on each card and determining which card wins according to a predetermined rule, such as the card having the highest value of the characteristic wins. The winner usually takes the loser's card.

It is known to store data in memory on smart cards and so-called "chip-and-pin" debit and credit cards. However, using such smart cards as trading cards or embedding memory into a trading card is prohibitively expensive. Furthermore, embedding memory into existing types of trading card would require significant changes in manufacturing, which is undesirable. Moreover, smart cards are read using devices which are themselves complex and expensive. Examples of trading cards in the form of a smart card are described in WO-A-0148580 and CA-A-2357934.

An alternative to storing data in embedded memory is to use a barcode, for example, as described in WO-A-2003018156. Although a barcode can be easily printed onto a card, it still requires a complex and expensive reading device.

WO-A-199535216 describes a lottery ticket bearing a printed circuit. The circuit is printed over symbols and under a scratch-off coating so that a printed circuit and a scratch-off coating are removed when the ticket is played. An electronic verification machine is used to determine which areas of the scratch-off coatings have been removed. Evidently, any tampering or alteration of the lottery ticket will cause a detectable change in a characteristic of the circuit. However, the printed circuit serves as a security device and is not used for storing data.

The present invention seeks to provide a trading card.

SUMMARY OF THE INVENTION

According to a first aspect of the present invention there is provided a chipless trading card including part of an electrical circuit.

The present invention also seeks to provide a card for comparing against another card in a game or pastime.

According to a second aspect of the present invention there is provided a chipless card for comparing against another card in a game or pastime including a part of an electrical circuit.

The card for comparing against another card in a game or pastime may be a trading card.

By a "chipless" card, we mean a card that does not include a chip of semiconductor material, such as silicon or gallium arsenide.

The part of the circuit may include at least one path comprising electrically conductive ink, electrically conductive paint and/or electrically conductive foil. The part of the circuit may comprise a plurality of terminals and a plurality of electrically conductive paths, wherein a first electrically conductive path links first and second terminals. A second electrically conductive path may connect third and fourth terminals and the first and second electrically conductive paths are electrically isolated from one another. A first part of the circuit may be disposed on a first face of the card and a second part of the circuit is disposed on a second face of the card. The first part of the circuit may include a first electrically conductive track and the second part of the electrical circuit may include a second electrically conductive track. The part of the circuit may be configured to store data. A fixed configuration of electrically conductive paths may encode a data value.

The card may comprise a plurality of terminals and a plurality of electrically conductive paths, each of at least some of the conductive paths being arranged to connect respective pairs of at least some of the terminals so as to provide a given arrangement of paths for storing a first data value, the first data value being determinable when another circuit is connected to the plurality of terminals. The card may be for co-operating with another card including another part of the circuit and having a corresponding plurality of terminals and a respective arrangement of paths for coding a second data value so as to permit comparison of the first data value with the second data value when the trading cards co-operate. The card may further include a battery and first and second indicators, wherein one of the first and second indicators is activated when the card co-operates with another card. The part of the circuit may be shared by a plurality of different circuits. The card may comprise part of a plurality of circuits. The card may comprise parts of a plurality of circuits.

The card may comprise first, second and third terminals which are electrically connected by at least a portion of the part of the circuit. The first, second and third terminals may be electrically connected to a node by respective first, second and third conductive tracks. The first and second terminals may be electrically connected by a first conductive track and the second and third terminals may be connected by a second conductive track.

The card may comprise a plurality of terminals at least two of which are electrically connected by at least a portion of the part of the circuit and at least one of the terminals is electrically isolated from all other terminals.

The card may comprise a plurality of terminals including a set of electrically connected terminals arranged along one edge of the card. The card may comprise a plurality of terminals including another set of electrically connected terminals arranged along one, different edge of the card.

The one edge may be a straight edge or an edge which turns through no more than 180 degrees. The terminals may touch the edge or be separated from the edge by no more than 2 mm.

According to a third aspect of the present invention there is provided a game card for receiving first and second trading cards including first and second parts of an electrical circuit respectively, the game card including a third part of the circuit for completing the circuit when the first and second trading cards are received.

According to a fourth aspect of the present invention there is provided a game card for receiving first and second cards for comparing against each other in a game or pastime including first and second parts of an electrical circuit respectively, the game card including a third part of the circuit for completing the circuit when the first and second cards are received.

The game card may be for comparing data stored on first and second cards. The game card may be for completing the circuit when the first and second cards are received by the game card. The third part of the circuit may comprise first and second sets of terminals for making contact to a first corresponding set of terminals on the first card and a second corresponding set of terminals on the second card respectively and a plurality of electrically conductive paths, some of the electrically conductive paths linking terminals in the first set of terminals to terminals in the second set of terminals. The game card may include at lest one power source, such as a battery, and at least one indicator, wherein an indicator is activated when the first and second trading cards are received. The game card may further include a data processing unit. The indicator may be a light emitter, such as a display, for example an electrochromic display, or a sound emitter.

According to a fifth aspect of the present invention there is provided a trading card system comprising a first trading card including a first part of an electrical circuit, a
second trading card including a second part of the circuit and means for connecting the first and second parts of the circuit.

According to a sixth aspect of the present invention there is provided a card system comprising a first card for comparing against another card in a game or pastime including a first part of an electrical circuit, a second card for comparing against another card in a game or pastime including a second part of the circuit and means for connecting the first and second parts of the circuit.

The means for connecting the first and second parts of the circuit may comprise a game card for receiving the first and second cards. The first and second cards may be received by the game card. The game card may have a face which is substantially the same area as a face of the first or second card.

The game card may include a first indicator having first and second terminals, a second indicator having first and second terminals, the first terminals of the first and second indicators may be provided proximate a first edge of a the card and the second terminals of the card may be provided proximate a second edge of the card. The indicators may be light emitting diodes.

According to a seventh aspect of the present invention there is provided a method of assembling a trading card system comprising a first trading card including a first part of an electrical circuit, a second trading card including part of the circuit; and means for connecting the first and second parts of the circuit, the method comprising using the connecting means to connect the first and second parts of the circuit.

According to an eighth aspect of the present invention there is provided a method of assembling a card system comprising a first card for comparing against another card in a game or pastime including a first part of an electrical circuit, a second card for comparing against another card in a game or pastime including part of the circuit; and means for connecting the first and second parts of the circuit, the
method comprising using the connecting means to connect the first and second parts of the circuit.

The means for connecting the first and second parts of the circuit may comprise a game card for receiving the first and second cards and using the connecting means to connect the first and second parts of the circuit may comprise coupling the first and second cards to the game card. The game card may include first and second slots for receiving cards and coupling the first and second cards to the game card comprises inserting the first card into the first slot and inserting the second card into the second slot.

According to a ninth aspect of the present invention there is provided a game including first and second cards for comparing against each other, said first and second cards including first and second parts respectively of an electrical circuit, means for receiving and electrically comparing said first and second cards and indicating a result of comparing the first and second cards, a board and at least one piece, the at least one piece being moved in accordance with the result.

According to a tenth aspect of the present invention there is provided a package for a product, the package including a removable trading card or card for comparing against another card in a game or pastime, said trading card or card including part of an electrical circuit.

According to an eleventh aspect of the present invention there is provided a method of manufacturing a trading card comprising designing a set of electrical circuits, wherein a first subset of the circuits has a part of a circuit in common and manufacturing a trading card including the part of the circuit.

According to a twelfth aspect of the present invention there is provided a method of manufacturing a card for comparing against another card in a game or pastime comprising designing a set of electrical circuits, wherein a first subset of the circuits has a part of a circuit in common and manufacturing a trading card including the part of the circuit.

According to a thirteenth aspect of the present invention there is provided a set of cards for comparing against another card in a game or pastime, for example a trading card, each card having a plurality of terminals occupying the same positions relative to the card, wherein, for a first card in the set, first and second terminals are electrically connected and, for a second card in the set, correspondingly-positioned first and second terminals are not electrically connected.

According to a fourteenth aspect of the present invention there is provided a set of cards for comparing against another card in a game or pastime, for example a trading card, a first card in the set having first and second terminals which are electrically connected and located at first and second positions relative to the card and a second card in the set not having a terminal located at one or both of corresponding first and second positions relative to the card.

According to a sixteenth aspect of the present invention there is provided a method of manufacturing a set of cards for comparing against another card in a game or pastime, for example a trading card, the method comprising, for each card, providing a plurality of terminals in the same positions relative to the card, for a first card in the set, providing an electrical connection between first and second terminals and, for a second card in the set, omitting to provide an electrical connection between correspondingly-positioned first and second terminals.

According to a seventeenth aspect of the present invention there is provided a method of manufacturing a method of manufacturing a set of cards for comparing against another card in a game or pastime, for example a trading card, the method comprising, for a first card, providing first and second terminals at first and second positions relative to the card and, for a second card, omitting to provide a terminal at one or both of corresponding first and second positions.

According to an eighteenth aspect of the present invention there is provided a electrical tester for an article, comprising an interface for removeably receiving the article, the interface having at least three contacts terminals, a power source, such as
a battery, having a terminal connected to a first contact terminal, a first indicator having a terminal connected to a second contact terminal and a second indicator having a terminal connected to a third terminal.

The indicators may be light emitting diodes and the electrical tester may be chipless.

According to a nineteenth aspect of the present invention there is provided a system comprising an electrical tester and an article, the article comprising a corresponding interface having at least three contacts terminals including fourth, fifth and sixth contact terminals arranged for connection with the first, second and third contact terminals respectively and a conductive path between the fourth contact terminal and one of the fifth and sixth contact terminals.

The electrical tester may be a game card and the article may be a trading card. The article may be a toy, such as a toy building brick.

BRIEF DESCRIPTION OF THE DRAWINGS

Embodiments of the present invention will now be described, by way of example, with reference to the accompanying drawings, in which.

DETAILED DESCRIPTION OF THE INVENTION

Figure 1:
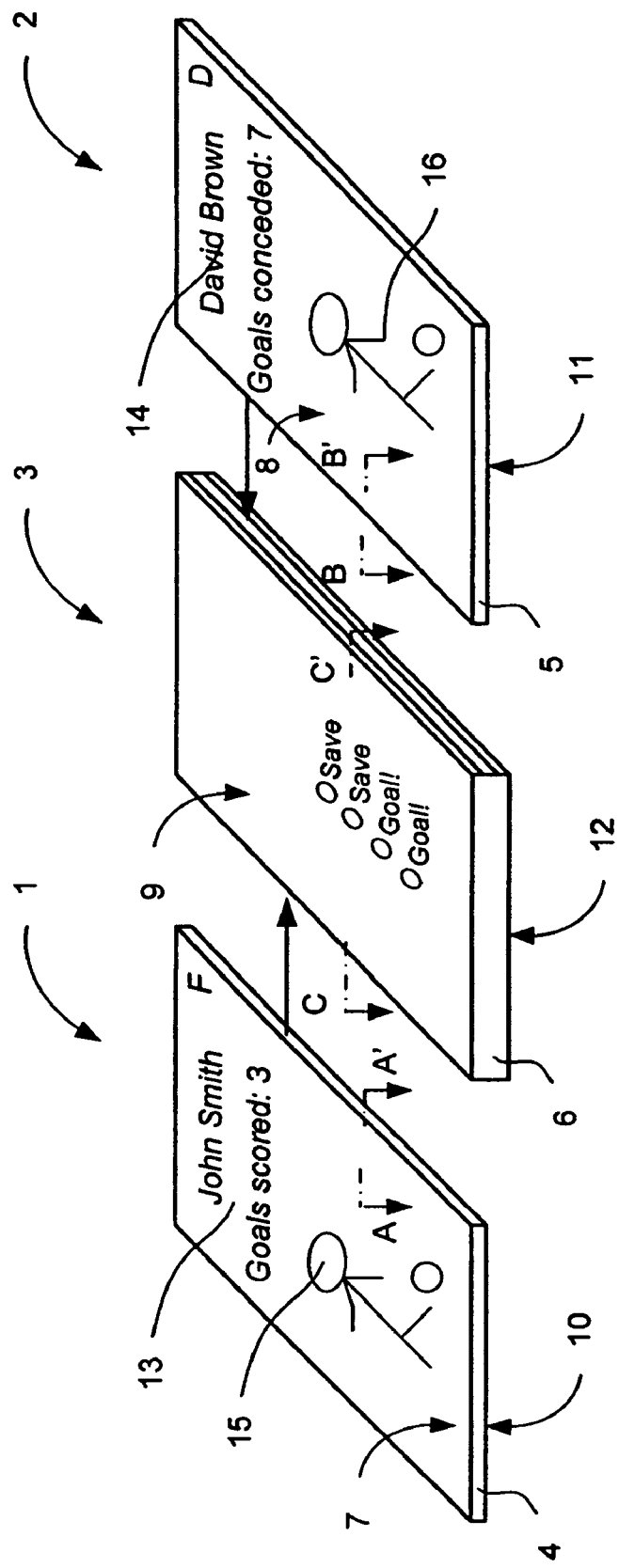
FIG. 1 is a perspective view of a pair of trading cards and a game card in accordance with the present invention.

Referring to FIG. 1, first, second and third cards 1, 2, 3 in accordance with the present invention are shown. The first and second cards 1, 2 are trading cards and
the third card 3 is a game card for comparing the first and second trading cards 1, 2 and for indicating a result of comparing the first and second trading cards 1, 2.

The trading cards 1, 2 are each respective ones of a set of cards (not shown) which relate to a given theme or subject and which are usually acquired and exchanged by collectors as a pastime. The game card 3 may also be one of the set of cards (not shown). In this example, the cards 1, 2, 3 relate to players of The (English) Football Association Premier League™.

The cards 1, 2, 3 each comprise a substrate 4, 5, 6 having a face 7, 8, 9 and a reverse face 10, 11, 12. In this example, the substrates 4, 5, 6 comprise stiff paper or thin cardboard. However, other materials, such as plastic, may be used.

The face 7, 8 of each trading card 1, 2 bears respective sets of text 13, 14 and respective at least one image 15, 16. Typically, each set of text 13, 14 includes a name and corresponding data. Text or images may be omitted.

In the case of football players, each set of text 13, 14 specifies a name of footballer and corresponding footballer statistics, such as number of goals scored (or conceded) in a season, average number of goals scored (or conceded) per game, number of games played, height, weight or the like. In this example, the first trading card 1 identifies a first footballer as being a forward and the second trading card 2 identifies a second footballer as a defender. The trading cards 1, 2 can identify more than one footballer, for example one forward and one defender.

Figure 2:
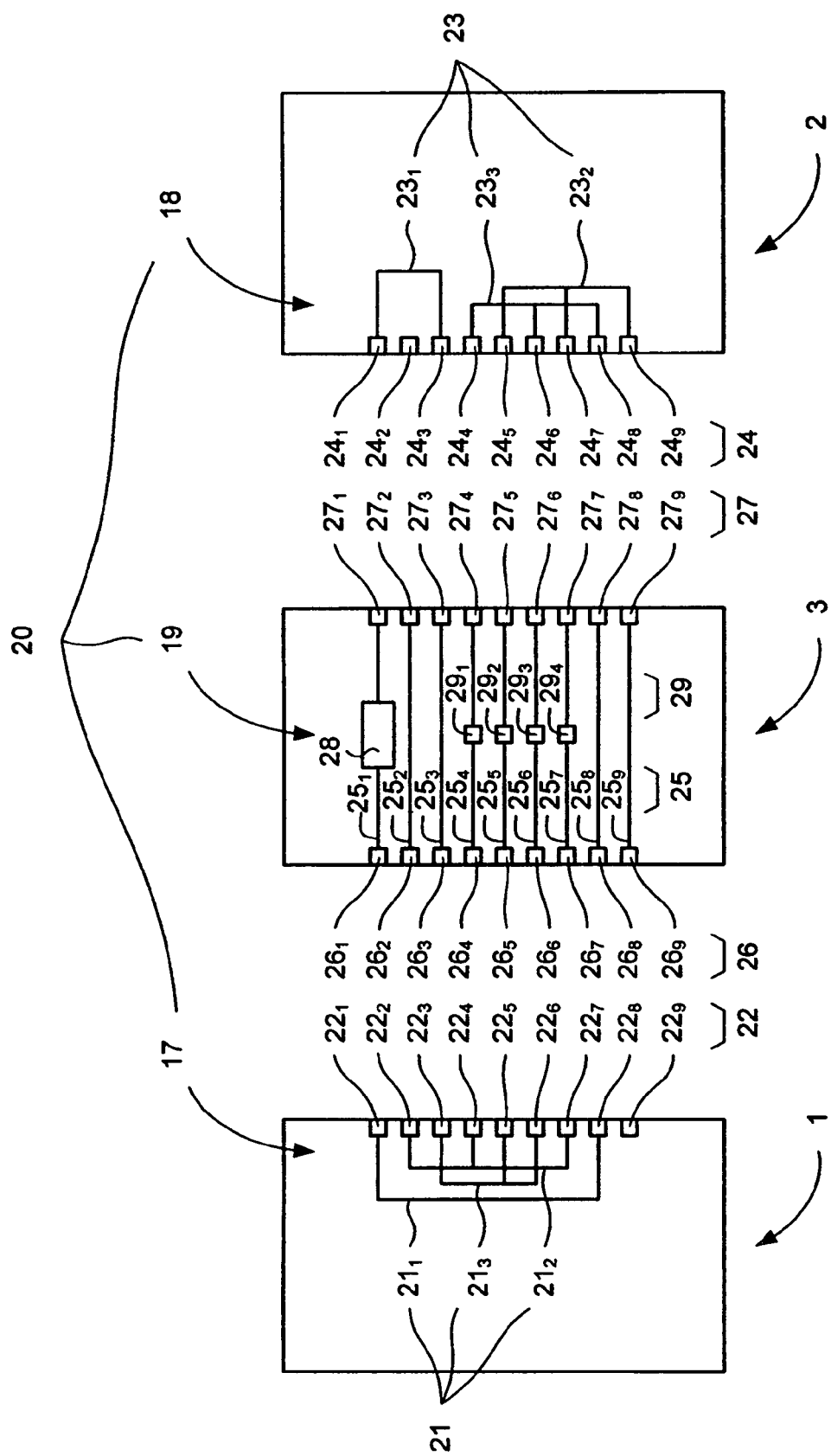
FIG. 2 is a plan view of the trading cards and a game card shown in FIG. 1.

FIG. 2 illustrates circuit portions of the cards 1, 2, 3. Each card 1, 2, 3 includes respective first, second and third parts 17, 18, 19 of an electric circuit 20. Each card 1, 2, 3 may include an additional, respective part of another circuit (not shown). The cards 1, 2, 3 may include respective complete circuits (not shown), which may be connected together.

The circuit 20 is one of a set of circuits (not shown) and each part 17, 18, 19 may be shared by more than one circuit (not shown). In other words, the first trading card
1 can be considered to form parts of several incomplete circuits (or logic circuits). When two cards are combined, one of the circuits is completed. Thus, the first and second parts 17, 18 and another third part (not shown) of a circuit may form another, different electrical circuit (not shown).

The first trading card 1 includes at least one electrically conductive path 21 and a plurality of terminals 22. Similarly, the second trading card 2 includes at least one electrically conductive path 23 and a plurality of terminals 24.

In the first trading card 1, the plurality of terminals 22 includes a first terminal $22_1$, a second terminal $22_2$, a third terminal $22_3$, a fourth terminal $22_4$, a fifth terminal $22_5$, a sixth terminal $22_6$, a seventh terminal $22_7$, a eighth terminal $22_8$ and a ninth terminal $22_9$. The terminals 22 are arranged in a row beginning with the first terminal $22j$ and ending with the ninth terminal $22_9$. The plurality of terminals 22 may comprise a different number of terminals and which may be arranged differently.

The at least one electrically conductive path 21 includes first, second and third electrically conductive paths $21_1$, $21_2$, $21_3$. The first electrically conductive path $2I_1$ connects the first and eighth terminals $22_1$, $22_8$. The second conductive path $21_2$ connects the second, fourth and seventh terminals $22_2$, $22_4$, $22_7$. The third electrically conductive path $21_3$ connects the third, fifth and sixth terminals $22_3$, $22_5$, $22_6$. The paths 21 and terminals 22 may be connected in different combinations.

In the second trading card 2, the plurality of terminals 24 includes a first terminal $24_1$, a second terminal $24_2$, a third terminal $24_3$, a fourth terminal $24_4$, a fifth terminal $24_5$, a sixth terminal $24_6$, a seventh terminal $24_7$, a eighth terminal $24_8$ and a ninth terminal $24_9$. The terminals 24 are arranged in a row beginning with the first terminal $2A_1$ and ending with the ninth terminal $24_9$. The plurality of terminals 24 may comprise a different number of terminals and which may be arranged differently.

The at least one electrically conductive path 23 includes first, second and third electrically conductive paths $23_1$, $23_2$, $23_3$. The first electrically conductive path $23_t$ connects the first and third terminals $24_1$, $24_3$. The second conductive path $23_2$ connects fifth, seventh and ninth fifth terminals $24_5$, $24_7$, $24_9$. The third electrically conductive path $23_3$ connects the fourth, sixth and eighth terminals $24_4$, $24_6$, $24_8$. The paths 23 and terminals 24 may be connected in different combinations.

The circuit parts 17, 18 include paths 21, 23 and terminals 22, 24. However, the trading cards 1, 2 may include components such as resistors, capacitors, inductors and transistors. For example, the trading cards 1, 2 may include logic elements or logic circuits (not shown) comprising transistors formed from organic semiconductors.

The first and second trading cards 1, 2 are chipless. Thus, the circuit parts 17, 18 are not formed in or on chips of semiconductor material, such as silicon or gallium arsenide, which are typically used to provide an integrated circuit with memory for conventional smart cards. Instead, the circuit parts 17, 18 are formed on or in the trading cards 1, 2 themselves.

The paths 21, 23 each comprise electrically conductive ink. However, the paths 21, 23 may comprise an electrically conductive paint or foil. The paths 21, 23 may comprise organic semiconductor material. Different lengths or sections of a path 21, 23 may comprise different electrically conductive materials. The terminals 22, 24 also comprise electrically conductive ink. However, the terminals 22, 24 may each comprise an electrically conductive paint or foil. Furthermore, the paths 21, 23 and the terminals 22, 24 may comprise different materials. For example, the terminals 22, 24 may comprise a foil, whereas the paths 21, 23 may comprise an ink. Terminals 22, 24 comprising foil instead of ink may provide contacts which are more durable and which have lower contact resistances.

Reference is made to WO-A-03068874 which describes a composition of and a method of printing an electrically conductive ink.

The paths 21, 23 each have a line width at least of the order of 10 μm. Preferably, the paths have a line width of 100 μm. Thicker line widths, for example of the order of 1 mm, may be used. In this example, the paths 21, 23 have the same line width. However, the line width need not be the same and may vary from one path 21, 23 to another and may vary along a given path 21, 23. The paths 21, 23 each have a thickness (in other words depth) at least of the order of 10 μm. As will be explained in more detail later, the paths 21, 23 have lengths of the order of 10 mm.

For a given length, line widths and thicknesses can be found by routine experiment so as to provide paths 21, 23 having suitably low resistances, for example of the order of between 0.1 and 100Ω.

The terminals 22, 24 provide electrical contacts to the paths 21, 23. Generally, terminals 22, 24 are wider than paths 21, 23. However, terminals 22, 24 need not be wider than paths 21, 23 and may simply be provided by regions, for example at beginning and ends, of a path 21, 23.

The game card 3 includes at least two conductive paths 25 and first and second pluralities of terminals 26, 27.

The paths 25 and terminals 26, 27 comprise electrically conductive foil. However, the paths 25 and/or terminals 26, 27 may comprise electrically conductive ink. Alternatively, a conventional so-called "flex circuit" can be used. Flex circuit normally comprises copper tracks arranged on a flexible plastic substrate, such as polyimide. The paths 25 have a line width of at least of the order of 10 μm and a line thickness of at least of the order of 10 μm.

As explained earlier, the game card 3 is for comparing the first and second trading cards 1, 2 and indicating a result of comparing the first and second trading cards 1, 2.

The game card 3 includes a power supply 28 in the form of a so-called "laminar" battery. The laminar battery 28 is approximately 300 μm thick, can apply a potential difference of 3.3V and supply 10 mAh. An example of a laminar battery is Solicore's Flexion™ lithium polymer battery which is available from Solicore, Inc., 2700 Interstate Drive, Lakeland, Fla. 33805 USA. Two or more power supplies may be provided.

The game card 3 also includes means 29 for indicating a result of a comparison. In this example, the indicating means 29 comprises two pairs of light emitting diodes $29_1$, $29_2$, $29_3$, $29_4$. However, more or fewer light emitting diodes may be used. Furthermore, other light or image indicators, such as electrochromic or electrophroetic displays, can be used. Electrochromic displays are described in U.S. Pat. No. 6,744,549 and are available from Aveso at http://www.avesodisplays.com. Electrophoretic displays are available from E Ink Corporation, 733 Concord Avenue, Cambridge, Mass. 02138 USA.

Additionally or alternatively to a light or image emitter, a sound emitter may be used. A combination of different types of indicator may be used.

The game card 3 may also include a data processing means (not shown) for controlling the indicating means 29. The game card 3 may also include a switch (not shown) for completing the circuit. Thus, if several circuits are provided, each with a switch, individual circuits can be selected.

Providing the power supply 28, the indicating means 29 and, optionally, the data processing means (not shown) on the game card 3 means that these components 28, 29 do not need to be included on the trading cards 1, 2. However, the game card 3 may be omitted and these components 28, 29 can be included on each of or shared between the first and second trading cards 1, 2.

In the game card 3, the first plurality of terminals 26 includes a first terminal $20_1$, a second terminal $26_2$, a third terminal $26_3$, a fourth terminal $26_4$, a fifth terminal $26_5$, a sixth terminal $26_6$, a seventh terminal $26_7$, a eighth terminal $26_8$ and a ninth terminal $26_9$. The terminals 26 are arranged in a row beginning with the first terminal $20_1$ and ending with the ninth terminal $26_9$. The plurality of terminals 26 may comprise a different number of terminals and which may be arranged differently.

The second plurality of terminals 27 includes a first terminal $27_1$, a second terminal $27_2$, a third terminal $27_3$, a fourth terminal $27_4$, a fifth terminal $27_5$, a sixth terminal $27_6$, a seventh terminal $27_7$, a eighth terminal $27_8$ and a ninth terminal $27_9$. The terminals 27 are arranged in a row beginning with the first terminal $21_1$ and ending with the ninth terminal $27_9$. The plurality of terminals 27 may comprise a different number of terminals and which may be arranged differently.

The at least two conductive paths 25 includes a first, second, third, fourth, fifth, sixth, seventh, eighth and ninth conductive paths $25_1$, $25_2$, $25_3$, $25_4$, $25_5$, $25_6$, $25_7$, $25_8$, $25_9$. In general, each path 25 connects a terminal in the first plurality of terminals 26 with a corresponding terminal in the second plurality of terminals 27. For example, the second conductive path $25_2$ connects the second terminal $26_2$ of the first plurality of terminals 26 with the second terminal $27_2$ of the second plurality of terminals 27. However, some paths 25 include additional components. The first conductive path $25j$ is arranged in series with the power source 28. The fourth, fifth, sixth and seventh conductive paths $25_4$, $25_5$, $25_6$, $25_7$ are each arranged in series with a respective light emitting diode $29_1$, $29_2$, $29_3$, $29_4$.

In this example, the light emitting diodes $29_3$, $29_2$, $29_3$, $29_4$ are used to indicate whether a goal is scored or whether a shot is saved. Thus, first and second light emitting diodes $29_1$, $29_2$ are coloured red to indicate a save and third and fourth light emitting diodes $29_3$, $29_4$ are coloured green to indicate a goal.

The indicating means may provide a message. For example, indicating means may be in the form of one or displays which, depending upon a comparison, reveal different messages or information, such as, instructions, clues or riddles, or images.

The cards may be used in a board game and the indicating means may provide instructions, for example "turn left", "turn right", "go up" and "go down" for moving a piece around a board.

Figure 3:
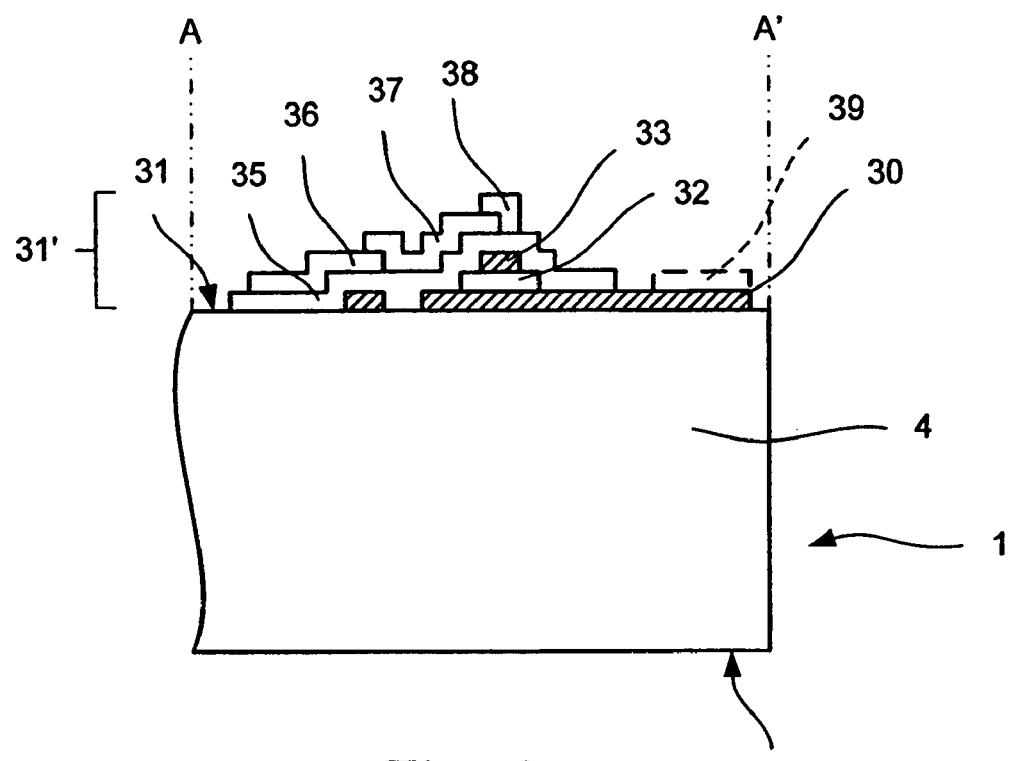
FIG. 3 is a cross section of part of the first trading card shown in FIG. 1 taken along the line A-A'.

Referring to FIG. 3, a cross section of a portion of the first trading card 1 is shown.

A first conductive path- and terminal-forming layer 30 (hereinafter referred to as path-forming layer for convenience) overlies portions of a surface 31 of the substrate 4. An insulating layer 32 overlies portions of the first conductive path-forming layer 30. The insulating layer 32 comprises non-conductive ink. However, the insulating layer 32 need not be an ink. For example, the insulating layer 32 may be a plastic which may be adhered using a glue. A second conductive path-forming layer 33 overlies portions of the substrate 4, the insulating layer 32 and the first conductive path-forming layer 30. This arrangement allows some conductive paths 21 to cross each without electrical contact. However, the insulating layer 32 and/or second conductive path-forming layer 33 may be omitted. The second conductive path-forming layer 33 or additional conductive path-forming layer (not shown) may overlie an opposing surface 34 of the substrate 4. The path-forming layers 30, 33 comprise electrically conductive ink.

First, second, third and fourth text- and image-defining layers 35, 36, 37, 38 (hereinafter referred to as image-defining layers for convenience) overlie portions of the path-forming layers 30, 33. The first, second, third and fourth image-defining layers 35, 36, 37, 38 comprise layers of cyan, magenta, yellow and black ink. Fewer or more image-defining layers may be provided. For example, a single ink layer, such as black ink, may be provided or the image-defining layers may be omitted with the path-forming layers 30, 33 providing text 13 and images 15.

Optionally, instead of using the path-forming layer 30 to form the terminal, a separate terminal-defining layer 39 (shown in chain) may be provided which overlies portions the path-forming layers 30, 33 and the substrate 4.

In the layer configuration just described, the image-forming layers 35, 36, 37, 38 generally overlie the path-forming layers 30, 33. However, other layer configurations may be used. For example, path-forming layers 30, 33 generally may overlie image-forming layers 35, 36, 37, 38. Path-forming layers 30, 33 and image-forming layers 35, 36, 37, 38 generally may be interwoven, i.e. overlie and underlie one another. The path-forming layers 30, 33 generally may be sandwiched between image-forming layers 35, 36, 37, 38. Holes or vias in an electrically non-conducting layer may permit two electrically conducting layer to be connected together.

The first trading card 1 is manufactured by providing a substrate 4 and applying successive layers of ink 30, 32, 33, 35, 36, 37, 38 using a printing process. The printing process may be ink-jet printing, a transfer printing or other process known in the art. The conductive inks 30, 33 can be applied in substantially the same way as conventional inks 35, 36, 37, 38. Thus, the trading card 1 can be manufactured using a conventional printing process.

The path-forming layer 30, 33 may be disposed on the surface 31 of the substrate 4, on a layer (not shown) or layers (not shown) overlying the substrate 4 and/or formed within a surface layer 31' overlying the surface 31 of the substrate 4. The surface layer 31' may comprise a plurality of layers, such as the path-forming layers 30, 33, the insulating layer 32 and image-defining layers 35, 36, 37, 38. Unlike conventional smart cards, the path-forming layers 30, 33 are not provided in or on a chip (not shown), which is usually embedded within a substrate. Thus, the circuit part 17 (FIG. 2) is provided over at least one surface of the trading card 1.

The path-forming layers 30, 33 may be laminated between the substrate 4 and another substrate or layer (not shown). For example, the path-forming layers may be applied to the surface 31 of the substrate 4 and another substrate (not shown) is attached over the path-covered surface 31 of the substrate 4, thus laminating the path-forming layers 30, 33. The other substrate (not shown) may have holes (not shown), cut-out regions (not shown) or be smaller than the substrate 4 so not to cover all of the substrate 4 when attached and thus permit the terminals 22 (FIG. 2) to be accessed. This arrangement can be used to protect the path-forming layers 30, 33.

Figure 4:
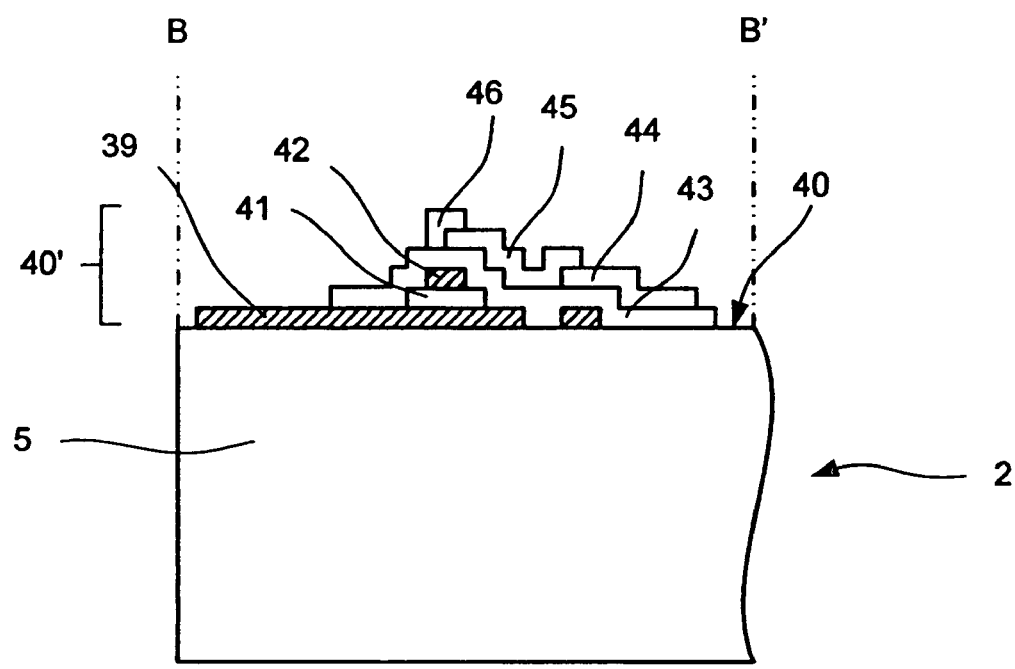
FIG. 4 is a cross section of part of the second trading card shown in FIG. 1 taken along the line B-B'.

Referring to FIG. 4, a cross section of a portion of the second trading card 2 is shown. The second trading card 2 has a similar layer configuration as the first trading card 1 and includes a first conductive path-forming layer 39 which overlies portions of a surface 40 of the substrate 5, an insulating layer 41, a second conductive path-forming layer 42 and first, second, third and fourth image-defining layers 43, 44, 45, 46.

The second trading card 2 is manufactured in the same way as the first trading card. The first and second trading cards 1, 2 may be manufactured simultaneously on a common substrate (not shown), such as a sheet. The sheet (not shown) is divided, for example by cutting or pressing, to form trading cards including trading cards 1, 2.

Similar to the first trading card 1, in the second trading card 2, the path-forming layer 39, 42 may be disposed on the surface 40 of the substrate 5, on a layer (not shown) or layers (not shown) overlying the substrate 5 and/or formed within a surface layer 31' overlying the surface 31 of the substrate 5. The surface layer 40' may comprise a plurality of layers, such as the path-forming layers 39, 42, the insulating layer 41 and image-defining layers 43, 44, 45, 46. Unlike conventional smart cards, the path-forming layers 39, 42 are not provided in or on a chip (not shown), which is usually embedded within a substrate. Thus, the circuit part 18 (FIG. 2) is provided over at least one surface of the trading card 2.

Similar to the arrangement in the first trading card 1, the path-forming layers 39, 42 may be laminated between the substrate 5 and another substrate or layer (not shown).

Figure 5:
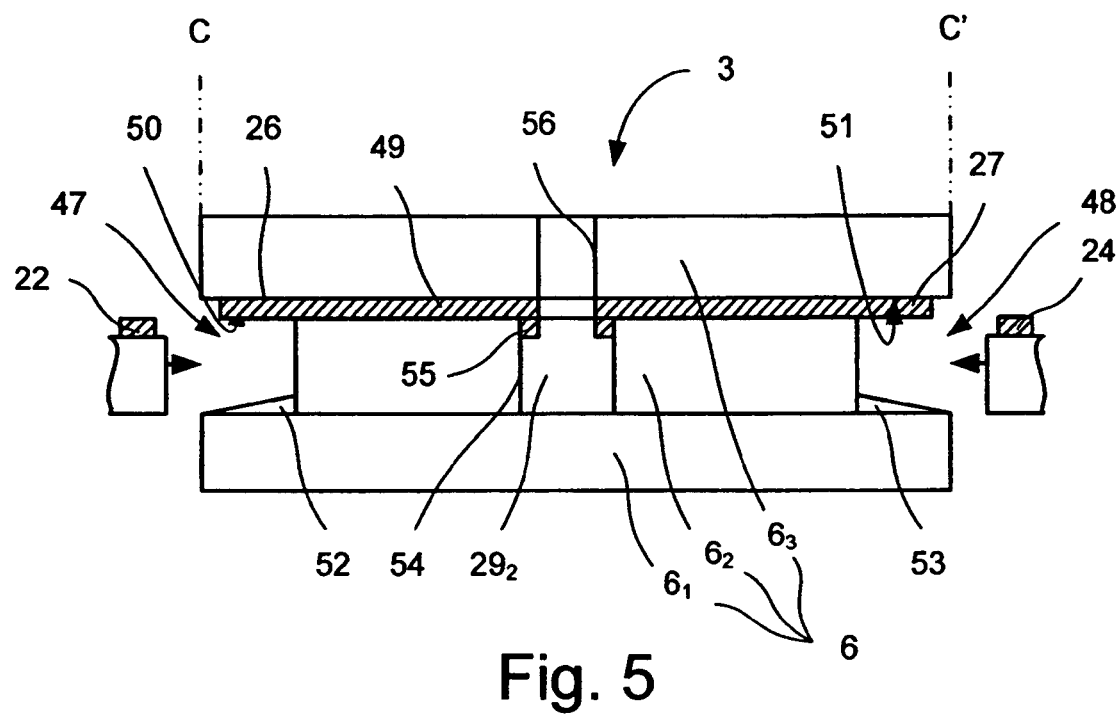
FIG. 5 is a cross section of a game trading card taken along the line C-C.

Referring to FIG. 5, a cross section of the game card 3 is shown.

The substrate 6 is arranged to provide first and second slots 47, 48 for receiving first and second trading cards 1, 2. A path- and terminal-defining layer 49 (hereinafter referred to an the path-defining layer 49) is embedded in the substrate 6 and overlies portions of first and second inwardly-facing slot surface 50, 51. As will be explained in more detail later, the path-defining layer 49 is embedded in the substrate 6 by using a laminated substrate.

First and second ramps 52, 53 may be provided in the slots 47, 48, for example on third and fourth inwardly-facing slot surfaces 52, 53 oppositely facing the first and second inwardly-facing slot surface 50, 51, for urging the terminals 22, 24 on a trading card 1, 2 against respective terminals 26, 27 on the game card 3, thereby helping to improve terminal contact.

A process for manufacturing the game card 3 will now be described.

The process comprises attaching first and second substrate portions $6_1$, $6_2$, for example by gluing. The second substrate portion $6_2$ is provided with recesses (not shown) or windows (not shown) to accommodate power source 28 (FIG. 2) and light emitting diodes $29_1$, $29_2$, $29_3$, $29_4$ (FIG. 2). For example, a recess 54 is provided to accommodate second light emitting diode $29_2$. The process further comprises providing a third substrate portion $6_3$ applying the path-defining layer 49, for example using hot-foil stamping, and laminating the second and third substrate portions $6_2$, $6_3$ so as to sandwich the path-defining layer 49 between the second and third substrate portions $6_2$, $6_3$. The power source 28 (FIG. 2) and light emitting diodes $29_1$, $29_2$, $29_3$, $29_4$ (FIG. 2) are provided with surface terminals (not shown). For example, the second light emitting diode $29_2$ is provided with a pair of terminals 55 to contact path-defining layer 49. The process further comprises attaching the second and third substrate portions $6_2$, $6_3$, for example by gluing. The third substrate portion $6_3$ is provided with windows (not shown) for light emitting diodes $29_1$, $29_2$, $29_3$, $29_4$ (FIG. 2). For example, a window 56 is provided for the second light emitting diode $29_2$.

As described earlier trading cards may be manufactured on the same substrate. Game cards may also be manufactured on the same substrate. Trading cards and even game cards may be manufactured on a substrate that can be used as packaging. Thus, a box, such as a cereal box, may include at least one trading card, for example trading card 1, which a player can cut out and use. The box may include a game card, such as game card 3.

The cards 1, 2, 3 are assembled by inserting the trading cards 1, 2 in the slots 47, 48 of game card 3.

Figure 6:
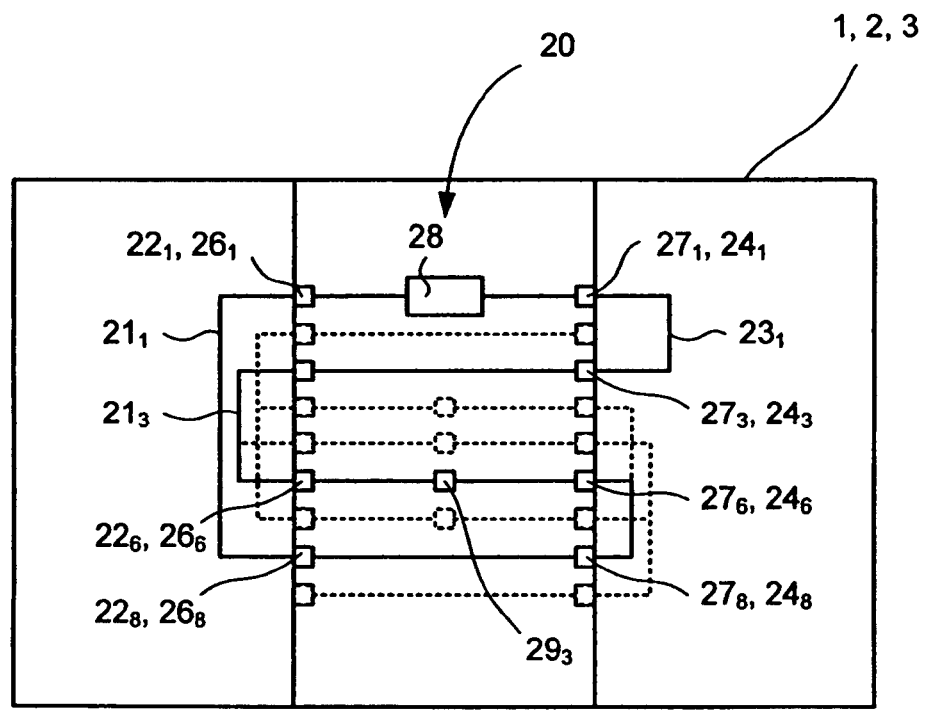
FIG. 6 is a plan view of the trading cards and a game card shown in FIG. 1 when put together.

Referring to FIG. 6, in an assembled state, at least some of the terminals 22 of the first trading card 1 contact respective terminals 26 of the game card 3. For example, the first terminal 22j of the first trading card 1 contacts the first terminal $2O_1$ of the first plurality of terminals 26 of the game card 3. Likewise, at least some of the terminals 24 of the second trading card 2 contact respective terminals 27 of the game card 3. For example, the first terminal $2A_1$ of the second trading card 2 contacts the first terminal $2I_1$ of the first plurality of terminals 27 of the game card 3. Thus, the first, second and third circuit portions 17, 18, 19 are joined and the circuit 20 is completed. Redundant paths (which may also be referred to as "redundant branches") are shown in chain. When the circuit 20 is completed, the third light emitting diode $29_3$ illuminates. This can indicate that a goal has been scored.

The game card 3 can be used to compare different cards. A combination of a pair of cards provides a respective circuit which illuminates at least one light emitting diode $29_1$, $29_2$, $29_3$, $29_4$ (FIG. 2) indicating a predefined result. Thus, a given path or branch on a card may be employed in one circuit, but may be redundant in other, different circuit.

For example, a forward can attempt to score a goal against a defender. By comparing the two trading cards 1, 2, the game card 3 can determine whether a goal has been scored. For example, Table 1 below illustrates whether a goal is scored or a shot is saved when a forward trading card (an A'-card) and a defender trading card (a 'D'-card) are compared.

TABLE 1

|    | D1   | D2   | D3   | D4   |
|----|------|------|------|------|
| A1 | Goal | Save | Goal | Save |
| A2 | Save | Goal | Save | Goal |
| A3 | Goal | Save | Goal | Save |
| A4 | Save | Goal | Save | Goal |

The first and second trading cards 1, 2 correspond to cards A1 and D3 in Table 1. Those skilled in the art will appreciate that current can be directed through a given light emitting diode $29_1$, $29_2$, $29_3$, $29_4$ (FIG. 2) by selectively varying the layout of the electrically conductive paths on the first and second trading cards 1, 2. By using four combinations of electrically conductive path layout on each of the first and second trading card 1, 2, sixteen different combinations of complete circuit layout may be formed. In fact, more than sixteen different combinations of complete circuit layout may be formed.

As explained earlier, the trading cards 1, 2 can be relate to more than one player, such as a forward and a defender. Thus, a trading card can carry more than one circuit portion, each circuit portion having a corresponding set of terminals. For example, a first set of terminals can run down a right-hand side edge of the card and a second set of terminals can run down the left-hand side edge of the care. Thus, the card can be used either as a forward trading card or a defender trading card or as two, different forward (or defender) trading cards. Furthermore, a card can carry a circuit portion for each side of the card, i.e. a card with n-sides can carry up to n circuit portions. Additional circuit portions can be included by placing more than one set of terminals along the same side. For example, an edge of the card can be divided into upper and lower parts, each having a separate set of terminals.

Additional circuit portions can also be included by placing terminals on both faces of a card.

Using a configuration of paths, the trading cards 1, 2 can provide means for encoding data, for example goal scoring/goal saving data, and/or for performing a computation. More complicated circuits may be used to encode more data and/or perform more complicated computations. By choosing a suitable indicating means 29, trading cards 1, 2 can be used to help those with impaired sight or hearing to use the cards.

It will be appreciated that many modifications may be made to the embodiments hereinbefore described. For example, the cards may relate to players of other football leagues (English, Scottish or overseas) or teams of football leagues. The cards may relate to international teams or players. The cards may relate to other aspects of football, such as managers or football stadia. The cards may relate to other team sports such as rugby union, rugby league, cricket or athletics, American football or baseball. The cards may relate to other types of sports, such as golf, tennis, boxing or wrestling. The cards may relate to sports such as motor racing or sailing. The cards need not relate to sport, but could relate to other subjects, such as cars, television programmes, films, cities. A playing card, such as a conventional Anglo-American playing card or a snap card, can be used. The card may be used in a board game. The card may carry a multiple-choice question and the part of the circuit may be used to reveal an answer when plugged into the board or a card reader.

The invention claimed is:

1. A game card having:
    a first set of terminals, and
    electrically conductive paths;
    a second set of terminals,
    the game card characterized by:
        first and second slots arranged along the first and second sides respectively for receiving and coupling first and second cards,
        a power source, and
        an indicator,
    wherein first and second ones of the first set of terminals are connected to respective first and second ones of the second set of terminals by respective electrically conductive paths, a third one of the first terminals is connected to a third one of the second terminals via the power source and a fourth one of the first set of terminals is connected to a fourth one of the second terminals via the indicator.

2. A game card according to claim 1, further including:
    a data processing unit.

3. A game card according to claim 1, wherein the indicator a light emitter.

4. A game card according to claim 3, wherein said the light emitter comprises a light emitting diode.

5. A game card according to claim 1, wherein the indicator comprises a display.

6. A game card according to claim 5, wherein the display is an electrochromic display.

7. A game card according to claim 1, wherein the indictor comprises a sound emitter.

8. A game card according to claim 1, comprising at least one further indicator.

9. A card system comprising:
a first trading card;
a second trading card; and
a game card according to claim 1;
wherein the first and second trading cards each comprise:
a chipless card having a plurality of terminals and
a plurality of electrically-conductive paths connecting at least some of the terminals,
wherein first and second terminals are electrically connected and third and fourth terminals are electrically connected but electrically isolated from the first and second terminals, wherein a fifth terminal is electrically isolated from all the other terminals and wherein said first, second, third, fourth and fifth terminals are arranged along one edge of the card.

10. A card system according to claim 9, wherein the first and second trading cards are received by the game card such that the terminals of the first trading card contact the first set of terminals of the game card and the terminals of the second trading card contact the second set of terminals of the game card.

11. A card system according to claim 9, wherein the electrically-conductive paths of the chipless cards include paths comprising electrically-conductive ink.

12. A card system according to claim 9, wherein the electrically-conductive paths of the chipless cards include paths comprising electrically-conductive paint and/or electrically-conductive foil.

13. A card system according to claim 9, wherein the plurality of terminals of a chipless card includes a sixth terminal, wherein said third, fourth and sixth terminals are electrically connected.

14. A card system according to claim 13, wherein said third, fourth and sixth terminals of a chipless card are electrically connected to a node by respective first, second and third conductive tracks.

15. A card system according to claim 9, wherein each chipless card includes another set of electrically-connected terminals arranged along another, different edge of the card.

16. A card system according to claim 9, wherein said edge of each chipless card is a straight edge or an edge which turns through no more than 180 degrees.

17. A card system according to claim 9, wherein the terminals of each chipless card are separated from the edge by no more than 2 mm.

18. A card system according to claim 9, wherein the terminals of each chipless card touch the edge.

19. A card system according to claim 9, further including an insulating layer, wherein a first conductive path crosses over a second conductive path and the insulating layer electrically isolates the first conductive path from the second conductive path.

20. A game including:
a card system according to claim 9;
a board; and
at least one piece,
wherein the game card indicates a result of comparing the first and second trading cards and the at least one piece is movable by a player in accordance with the result.

21. A method of manufacturing, comprising:
providing a game card;
providing a first set of terminals on the card, and
providing electrically conductive paths on the card;
providing a second set of terminals on the card,
the method characterized by:
providing first and second slots arranged along the first and second sides respectively of the card for receiving and coupling first and second cards
providing a power source, and
providing an indicator,
wherein first and second ones of the first set of terminals are connected to respective first and second ones of the second set of terminals by respective electrically conductive paths, a third one of the first terminals is connected to a third one of the second terminals via the power source and a fourth one of the first set of terminals is connected to a fourth one of the second terminals via the indicator.

22. A method according to claim 21, comprising:
providing a trading card;
providing a plurality of terminals on the trading card; and
providing a plurality of electrically-conductive paths connecting at least some of the terminals.

* * * * *